Figure 1:
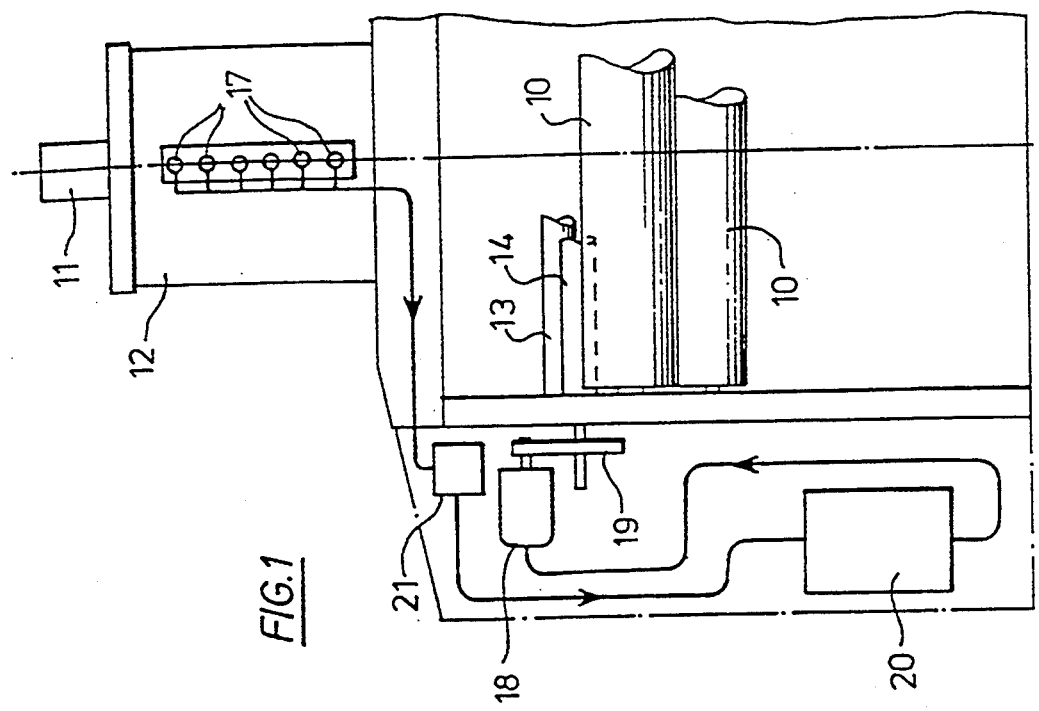

United States Patent [19]

Jagger et al.

[11] Patent Number: 5,433,391
[45] Date of Patent: Jul. 18, 1995

[54] CEREAL MILLING MACHINE

[75] Inventors: John C. G. Jagger, Altrincham; Alan M. Chadwick, Warrington, both of United Kingdom

[73] Assignee: Satake UK Limited, Cheshire, United Kingdom

[21] Appl. No.: 211,077

[22] PCT Filed: Oct. 9, 1992

[86] PCT No.: PCT/GB92/01852
§ 371 Date: Mar. 18, 1994
§ 102(e) Date: Mar. 18, 1994

[87] PCT Pub. No.: WO93/06928
PCT Pub. Date: Apr. 15, 1993

[30] Foreign Application Priority Data

Oct. 11, 1991 [GB] United Kingdom ............ 9121616
Aug. 10, 1992 [GB] United Kingdom ............ 9216765

[51] Int. Cl.⁶ .................................. B02C 4/28
[52] U.S. Cl. ........................... 241/34; 241/227
[58] Field of Search .............. 241/34, 227, 37

[56] References Cited

U.S. PATENT DOCUMENTS

| 3,468,488 | 9/1994 | Karrer et al. | 241/34 |
| 4,037,712 | 7/1977 | Wochnowski | 198/524 |
| 4,856,716 | 8/1989 | Burstedt | 241/30 |
| 4,869,434 | 9/1989 | Folsberg | 241/34 |
| 5,174,511 | 12/1992 | Ruegger et al. | 241/34 |

Primary Examiner—John Husar
Attorney, Agent, or Firm—Nies, Kurz, Bergert & Tamburro

[57] ABSTRACT

A cereal milling machine having a stock reservoir for incoming stock to be milled, a pair of motor driven feed rolls for metering the stock at a controlled rate from the reservoir, and a pair of grinding rolls for receiving the stock from the feed rolls. A stock level control system comprises a vertical array of spaced capacitive switches located outside the reservoir, each sensor producing an electrical signal according to the presence or absence of stock at the level of the individual sensor, a variable speed motor driving the feed rolls and a micro-computer connected to the sensors and to the motor via an inverter to accelerate or decelerate the motor as a result of changes in the level of stock in the reservoir. The control system ensures a substantially constant mean level of stock in the reservoir and protects the grinding rolls.

19 Claims, 1 Drawing Sheet

CEREAL MILLING MACHINE

This invention concerns cereal milling machines. Such machines provide a pair of grinding rolls arranged in close parallel proximity to form a nip therebetween through which stock to be milled is passed. The stock is fed to the grinding rolls at a controlled and substantially constant rate usually by a pair of feed rolls interacting with a feed gate at the bottom of a stock reservoir. The reservoir receives stock to be milled at a substantially constant rate although, in practice, this rate can vary considerably during a production run so that the reservoir becomes overfilled or alternatively empties out providing no stock to be fed to the interface of the grinding rolls.

The reservoir is usually in the form of a container mounted on the top of a milling machine and made from a transparent material so that the operator may watch the stock available for the machine.

Several kinds of sensor have been adopted for detecting the instantaneous level of stock within the reservoir. These include optical devices such as a photo-electric cell on one side of the transparent reservoir, and a light source on the other. However, these devices suffer from the disadvantage that the dust which inevitably accumulates on the internal wall surface of the reservoir, causes inaccurate sensing of the stock. Other devices include mechanical and electrical probes situated within the reservoir and providing actuation, by movement or by electrical signal, of other devices adapted to control the rate of feed through the feed gate to the grinding rolls. Such devices have suffered from the disadvantage that they interfere with the movement of stock within the reservoir, in some instances causing bridging of the stock or the creation of voids therein, and inaccurate sensing, whilst the sensors themselves are prone to failure due to the presence of the stock flowing past them. Furthermore, electrical devices such as capacitive analogue probes have been found to be susceptible to moisture and other properties of the stock with the result that the sensitivity of such level sensors has been difficult to control.

While it is required to prevent stock level in the reservoir from increasing or reducing excessively it is nevertheless important to ensure minimal changes in feed roll speed commensurate with maintaining the level of stock within an acceptable range. Hence it is important to prevent the control mechanism for the feed roll drive from altering the speed of drive too rapidly and to an excessive extent as a result of small changes in the level of stock within the reservoir. For example, if the level should rise by just a small amount then the speed of operation of the feed rolls should either remain constant or be increased only slightly, while larger and more sudden changes of level should be compensated for by appropriate acceleration or deceleration accordingly of the feed roll motor.

An object of the present invention is to provide a cereal milling machine having a stock level sensing means with consequent control of the feed of stock, wherein the aforementioned disadvantages are avoided.

According to the present invention, there is provided a cereal milling machine having a stock reservoir for incoming stock to be milled, at least one driven feed roll for metering the stock at a controlled rate from the reservoir, a variable speed motor to drive the feed roll or rolls, and a pair of grinding rolls for receiving the stock from the feed roll or rolls; characterised by a stock level control system comprising a sensor located so as to be out of contact with the stock and of a kind which does not transmit light from side to the other of the stock reservoir, said sensor being adapted to produce an electrical signal proportional to a rise or fall in stock level in the reservoir, and by control means connected to the sensor and to the motor and responsive in normal operation of the machine to the electrical signals from the sensor so as to accelerate or decelerate the feed roll motor at a rate dependent upon the degree of change in the level of stock in the reservoir beyond a predetermined target zone.

Preferably, said sensor is provided as a vertical array of spaced sensors comprising a bank of six capacitive switches connected collectively to a micro computer from which an output signal may be fed to a speed controller for the variable speed motor, which controller directly determines tile speed of operation and acceleration or deceleration, of the variable speed motor.

In accordance with the invention the control means will compensate for level errors by "ramping" up and down the feed roll speed. The amount of the error which has occurred will effect the rate of the ramp i.e. acceleration or deceleration of feed roll speed, rather than having a direct effect on the feed roll speed itself.

Figure 2:
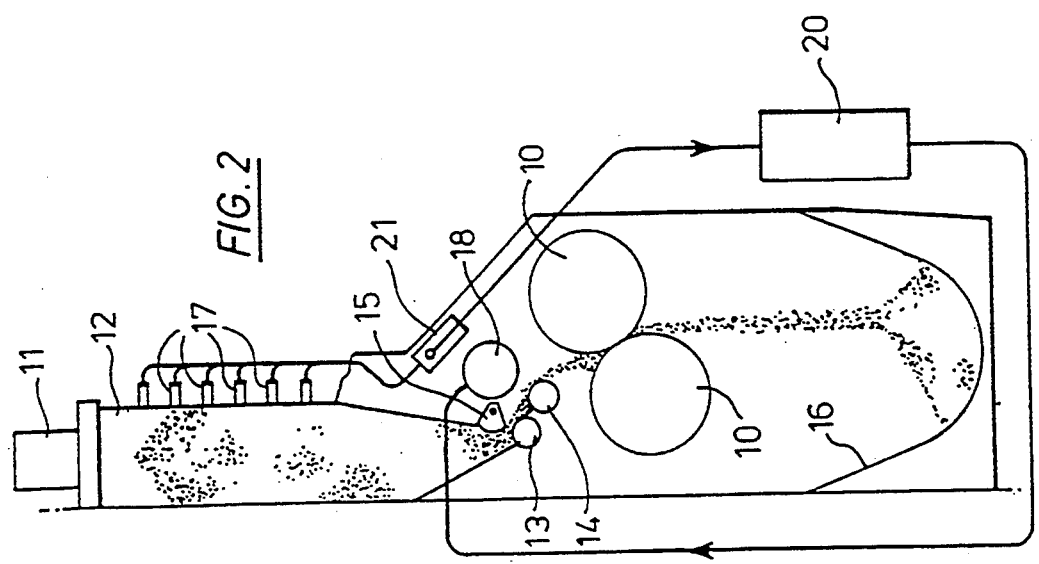

An embodiment of the invention will now be described, by way of example only, with reference to the accompanying schematic drawings in which:

FIG. 1 is a partial front elevation of a cereal rollermill; and FIG. 2 is a partial end view thereof.

A cereal rollermill made in accordance with the invention comprises a pair of grinding rolls 10 disposed with their axes parallel to form a nip through which cereal stock is fed to be reduced. The drive means for the driving rolls 10 has been omitted from the drawings for the sake of clarity.

In the operation of a conventional rollermill, flour stock enters the machine via an inlet spout 11 at the top and accumulates in a sight-glass reservoir 12. At its base, the reservoir is tapered towards an outlet at which a pair of motorised feed rolls 13 and 14 interface with a preset gate 15 to permit the stock to flow at a controlled rate into the nip of tile grinding rolls 10.

A nominal feed gap between the feed rolls and the feed gate is set to give the required nominal volumetric flow.

After milling, the stock is allowed to fall into a hopper in the base of the machine to be discharged therefrom by means (not shown) for further treatment.

For continuous operation of a series of such machines, it is necessary that the stock level neither rises nor falls excessively in the sight-glass 12 of each machine, but remains within the confines of the reservoir, and that as far as possible the rate at which the stock flows to the grinding rolls remains substantially constant.

In accordance with the invention, there is provided a control system for monitoring and regulating the flow of stock. This system comprises a bank of six capacitive switches 17. The feed rolls 13 and 14 are driven by a variable speed induction motor 18 which drives at least one of the rolls via a toothed flexible belt 19 and reduction pulleys (not shown).

An inverter 20 is provided to vary the speed of motor 18. The inverter 20 receives control signals from a micro-computer 21 which is responsively connected to the bank of capacitive switches 17.

Thus, micro-computer 21 receives signals from the switches 17 representative of the presence or absence of stock in the sight-glass 12 adjacent each individual switch 17.

The micro-computer 21 converts a number of discrete level measurements into a continuously variable value of motor speed.

The micro-computer 21 working in conjunction with the bank of capacitive switches 17 which are equally spaced in a vertical array provides many different speed responses according to the instantaneous level of stock, its level at the last instance, and the direction from which it has come in the interim.

In operation, if the switches 17 detect a stock level between the middle pair of switches then the condition is stable and there will be no resultant change in the speed of the motor 18. If the stock level should rise to between the second and third switch from the top then a signal is fed to the micro-computer 21 and in turn to the inverter 20 to produce gradual acceleration of the motor 18 which in turn ramps up the speed of the feed rolls and the flow of stock out of the sight-glass in order to bring the level back eventually to a location between the middle pair of switches. If the level should rise above the next switch 17 the acceleration, or rate of change of feed roll speed, is increased, and if the level should rise above the top switch the acceleration is increased further.

If the level is low and should rise from a position between the two lowermost switches to a position above the next switch there will be no alteration of feed roll speed, but if the level falls again to the position between the lowermost two switches the feed rolls are decelerated at a medium rate to compensate fairly rapidly for the falling stock level. If the level had fallen to below the lowermost switch then the rolls would have been decelerated at the maximum rate to re-establish the correct level as quickly as possible. It must be appreciated that the actual speed of the feed rolls is ramped up and down by this system thus never to produce a sudden change in speed as the stock moves from one level to another.

If the stock is rising and reaches the position between the middle pair of switches then the speed of the feed rolls changes to a value which depends on both the speed of entry to that level and the speed of exit from that level the previous time. Thus, the micro-computer is able to assess the base speed which is required to maintain a constant level under normal conditions. Any changes in level cause deviations in the base speed i.e. the normal or target speed of operation. This speed is adjusted as necessary to meet the flow of stock into the rollermill. The micro-computer 21 memorises this speed so that even if power is lost the rollermill will revert to the previous conditions when the power is restored. This self-adjusting behaviour allows good stability of speed to be achieved at the desired level.

In short, the amount by which stock level changes from a central "target" zone will determine the acceleration or deceleration rate of the feed roll drive. Variations of level within the central region between the two middle switches, causes no alteration in the speed of drive so that naturally occurring small changes in level do not cause the motor to accelerate or decelerate the feed rolls. Thus, there may be three rates of acceleration and deceleration above and below respectively the target zone between the middle pair of switches. When the stock advances or retracts from that zone the rate of acceleration or deceleration will be selected automatically to restore the level to the target zone as quickly as possible.

With this method, full use is made of the reservoir provided by the sight-glass 12 whereby the stock level is permitted to vary considerably whilst the speed variation of the motor is minimised. Thus, random fluctuations in stock flow are not passed on from one milling machine to the next in a line.

The basic control function as described above also has a number of important features. For instance, some kinds of stock are much more voluminous than others and therefore tend to fill the fixed volume of the reservoir much more quickly. Typically, so called break stocks therefore need a much more rapid variation of the speed with stock level changes than do other forms of stocks such as reduction stocks. Accordingly, the acceleration or deceleration rates of the feed roll motor would be much more pronounced. This is easily accomplished with the micro-computer 21 by setting a switch according to the type of stock to be handled, to adjust the overall acceleration and deceleration rates.

Furthermore, break stocks are subject to considerable changes of level which are caused, not necessarily by increases and reductions in quantity of stock in the reservoir but by the sudden appearance and disappearance of voids within the stock. These voids are caused by stock not flowing freely through the rollermill, and it is desirable to avoid making speed changes in response to the resultant constantly changing levels. This can be achieved by rendering the initial or slow acceleration or deceleration rates for break stocks to be almost nil so that a large "dead zone" exists between the middle four sensors defining three levels where speed changes are very small. On the contrary, when a more stable, less voluminous stock is established in the reservoir the natural level fluctuation is much less pronounced and so only the two middle sensors would provide the necessary "dead zone". Thus, the extent of the target zone and, accordingly, the sensitivity of the control means, are adjustable.

In accordance with certain operating conditions it may be necessary on occasions to close down or suspend the operation of all the rollermills. When a mill plant is suspended in this way all rollermills stop grinding and the stock flow ceases. However, stock which is in transit by gravity continues to flow into each rollermill to some extent filling up the stock reservoirs. When the mill plant restarts, it is desirable to provide a gradual increase in the feed through each rollermill to minimise the quantity of off-grade flour.

The micro-computer 21 is programmed to recognise the occurrence of a mill suspension and to implement some special control features. For example, on re-starting the mill, the acceleration and deceleration of the feed rolls still depends upon stock level, but the starting speed is selected at the minimum possible thus gently restarting and restocking the flour mill. In addition, it is recognised that stock flow quantities will be much as they were established before the suspension and therefore the micro-computer 21 does not recalculate the base speed for an initial time delay thereby re-establishing previous conditions as quickly as possible. Alternatively, the micro-computer 21 may be instructed by a central computer controlling several rollermills, to restart the rollermill but at a last base speed independent of the stock level. The central computer will then assess when to permit normal adjustment of the feed roll speeds to commence.

Since the capacitive switches are not located inside the sightglass, no interference with the stock is experienced, and the nature of the capacitive switches is such that they are not affected by normal deposits of dust on the internal wall.

The system is preferably enhanced by the provision of a further sensor to detect the feed roll speed, both to provide an operator read-out of feed roll speed and to sense whether any part of the drive system has failed.

An electrical current sensor associated with the grinding roll motor will be provided, in the usual way, to provide operator read-out.

The micro-computer 21 or another such device may be adapted to cause the grinding rolls to separate automatically if the stock level falls below the lowest of the switches 17 for more than a predetermined time. Also, the grinding rolls will be adapted to part automatically or remain apart if the feed rolls are not rotating.

The provision of sensors outside of the reservoir and which are not susceptible to optical difficulties, enables their sensitivity to be pre-set for all types of stock to be treated. This considerably reduces operator setting-up time when compared with systems incorporating capacitive analogue probes within the stock which are sensitive to the instantaneous properties thereof.

The micro-computer 21 may be provided with a serial communication port. Individual micro-computers on individual rollermills can each be caused to transmit information to a higher level central process plant control computer. By communicating the rotational speed of the feed rolls 13 and 14 to the central computer, the volumetric flow rate at each rollermill and the distribution of the stocks between the machines can be monitored. This information can be used to maintain a constant distribution of stock between machines, to optimise that distribution or to detect the occurrence of errors in that distribution.

It is not intended to limit the invention to the above embodiment. For example, the capacitive switches 17 may be replaced by one or more external ultrasonic probes which are equally non-intrusive and independent of stock type. Short range ultrasonic transmitter/receivers with integral electronics can provide a conveniently packaged level sensor with a fully analogue output representing the instantaneous level. In this case, the level is determined by the distance from the sensor which may be mounted vertically above the stock, to the surface of stock in the reservoir.

In a further alternative the sensor or sensors may be provided in the form of an optical sensor capable of transmitting light to, and receiving reflected light from, stock present in the reservoir. Like the capacitive switches and the ultrasonic probes, the optical sensor must be located outside the reservoir and should transmit light directly onto the stock, from above, rather than through the sight glass of the reservoir.

It is to be understood that the grinding rolls referred to may be of the smooth or fluted-surface type and the term is intended to be construed as including flaking rolls and other cereal working devices.

We claim:

1. A cereal milling machine having a stock reservoir for incoming stock to be milled, at least one driven feed roll for metering the stock at a controlled rate from the reservoir, a variable speed motor to drive said at least one feed roll and a pair of grinding rolls for receiving the stock from said at least one feed roll characterized by a stock level control system comprising a sensor located so as to be out of contact with the stock and of a kind which does not depend upon transmission of light through the stock reservoir from one side to the other, said sensor being adapted to produce an electrical signal proportional to a rise or fall in stock level in the reservoir, and by control means connected to the sensor and to the motor and responsive in normal operation of the machine to the electrical signals from the sensor so as to vary the speed of the feed roll motor at a rate proportional to a variation in the level of stock about a predetermined target zone.

2. A cereal milling machine according to claim 1, wherein the control means is adapted to prevent speed variation of the feed roll motor while the level of stock remains within the target zone, and wherein the extent of such zone is adjustable thus to vary the sensitivity of the control means.

3. A cereal milling machine according to claim 1, wherein the overall speed variation rates for the motor as determined by the control means, are adjustable.

4. A cereal milling machine according to claim 1, wherein the sensor is provided as a vertical array of capacitive switches connected collectively to a micro-computer from which an output signal may be fed to a speed controller for the feed roll motor, which controller directly determines the speed of operation and acceleration or deceleration of the feed roll motor.

5. A cereal milling machine according to claim 4, wherein said feed roll motor is an induction motor and said speed controller is a variable frequency inverter.

6. A cereal milling machine according to claim 4, wherein said capacitive switches are six in number.

7. A cereal milling machine according to claim 4, wherein the micro-computer is adapted to convert intermittent discrete level measurements as detected by said sensors into a continuously variable value of motor speed.

8. A cereal milling machine according to claim 4, wherein the micro-computer is adapted to produce an output signal proportional to the rise or fall of stock within the reservoir about a middle pair of sensors thus to determine an appropriate degree of acceleration or deceleration respectively of the motor to restore the level of stock within the reservoir at an appropriate rate.

9. A cereal milling machine according to claim 4, wherein the micro-computer is adapted to recalculate the value of the output signal to the speed controller whenever the level of stock returns to the target zone, such that the disturbance in stock flow which caused the departure from the target zone is compensated, and the level restored to and maintained within the target zone.

10. A cereal milling machine according to claim 4, wherein the micro-computer is adapted to cause the grinding rolls to separate automatically if the stock level falls below the lowest of the array of sensors for more than a predetermined time.

11. A cereal milling machine according to claim 4, wherein the micro-computer includes a serial communication port thus to be capable of being placed in communication with similar micro-computers associated with a plurality of milling machines thus to provide common information as to the operation of said plurality of machines.

12. A cereal milling machine according to claim 4, wherein the micro-computer is programmed to recognize a mill suspend and to ensure that upon restarting, the feed roll motor operates at a minimum speed and does not accelerate or decelerate said motor for a predetermined time until normal operation of the mill has been resumed.

13. A cereal milling machine according to claim 1, including a pair of said motor driven feed rolls which interact with a preset feed gate to permit the stock to flow at a controlled rate to the grinding rolls.

14. A cereal milling machine according to claim 13, wherein the feed gate is set in relation to the feed rolls to provide the required nominal volumetric flow.

15. A cereal milling machine according to claim 1, wherein said at least one feed roll is driven by said variable speed motor via a toothed flexible belt.

16. A cereal milling machine according to claim 1, including a further sensor to detect the feed roll speed and to provide an operator read-out of the feed roll speed.

17. A cereal milling machine according to claim 1, including a current sensor associated with the grinding roll motor to provide an operator read-out of the grinding roll motor current.

18. A cereal milling machine according to claim 1, wherein the sensor is provided as an ultrasonic sensor mounted vertically above the stock to determine the distance from the sensor to the surface of the stock in the reservoir.

19. A cereal milling machine according to claim 1, wherein the sensor is provided as an optical sensor mounted vertically above the stock, capable of transmitting light to and receiving reflective light from stock present in the reservoir, to determine the distance from the sensor to the surface of the stock in the reservoir.

* * * * *

UNITED STATES PATENT AND TRADEMARK OFFICE
CERTIFICATE OF CORRECTION

PATENT NO. : 5,433,391
DATED : July 18, 1995
INVENTOR(S) : John C.G. Jagger et al.

It is certified that error appears in the above-identified patent and that said Letters Patent is hereby corrected as shown below:

```
Column 2, lines 19 and 44, cancel "tile", insert --the--
```

Signed and Sealed this

Twenty-sixth Day of December, 1995

Attest:

BRUCE LEHMAN

Attesting Officer      Commissioner of Patents and Trademarks